US005473386A

United States Patent [19]

Helfrich et al.

[11] Patent Number: 5,473,386

[45] Date of Patent: Dec. 5, 1995

[54] VIDEO DISPLAY DEVICE EMPLOYING TWO SYNC GENERATIONS

[75] Inventors: Kenneth J. Helfrich; Joseph C. Stephens, both of Hamilton, Ind.

[73] Assignee: Thomson Consumer Electronics, Inc., Indianapolis, Ind.

[21] Appl. No.: 207,917

[22] Filed: Mar. 8, 1994

[51] Int. Cl.[6] .......... H04N 5/06

[52] U.S. Cl. .......... 348/521; 348/555

[58] Field of Search .......... 348/554, 555, 348/556, 557, 521, 522, 523, 524

[56] References Cited

U.S. PATENT DOCUMENTS 4,661,844 4/1987 Rufray et al. .......... 348/557

FOREIGN PATENT DOCUMENTS 2066598 7/1981 United Kingdom .

2093289 8/1982 United Kingdom .

*Primary Examiner*—Victor R. Kostak

*Assistant Examiner*—Nathan J. Flynn

*Attorney, Agent, or Firm*—Joseph S. Tripoli; Joseph J. Laks; Francis A. Davenport

[57] ABSTRACT

A video display has microcomputer control via a data bus and comprises a first sync generator coupled to the data bus for control by data thereon. A second sync generator is without controllable coupling to the data bus. A deflection amplifier is coupled to a deflection coil for generating a deflection current therein. A circuit for controlling the second sync generator is coupled to the first sync generator and is responsive to a digitally controlled signal therefrom. The second generator output signal is coupled to the deflection amplifier for deflection generation responsive to the digitally controlled signal.

16 Claims, 4 Drawing Sheets

S. M. RUN SUPPLY 650
VIDEO
HORIZ. DEFL. AMP. 600
TUNER 220
DE-MOD 101
IC100
RT
IF
HD
SEL. 104
SYNC GEN 110
R
G
B
DATA BUS 250
OSC 112
DIV 113
VERT 114
VERT. DEF AMP 700
PD 111
PS 116
SQU. 115
VERT
MICRO COMPUTER 200
SYNC SEP. 105
AUDIO
CHD 117
PARAB 120
SEL.VIDEO
VERT
HD
CHD
PARAB
RT
CHASSIS
J1
MODULE
SYNC GEN CONTROL 500
VERT DEFL. GEN 410
REMOTE CTRL 210
SYNC GEN 450
400

J4802
VERT_OUT
PARAB IN
+7.6V RUN
R1 20K
C1 .1μF
C2 2.2μF
U1A
R2 130K
Q1
R28 2.2K
R27 47K
+12V RUN (FROM CHROMA PROC. 300)
R23 2.2K
R25 4.3K
R26 10K
R22 68K
Q5
50/60 MODE CONTROL (FROM FIG. 3)
R3 20K
+12V RUN
R5 10K
R4 10K
D1
C3 10μF
Q2
R32 68K
Q3
R31 68K
R51 20K
U1D
50Hz SIZE
Q50
R52 1K
R54 10K
R53 660
R55 10K
Q51
CS50
R9 1.2K
R8 1.8K
R11 15K
V. SIZE
C6 .47μF
U1B
R12 220K
V. CENTERING
R19 68K
R13 10K
R20 1.2K
R21 5.6K
R65 20K
R64 1.47K
U1C
Q60
R63 11.8K
R29 47K
R61 47K
Q61
Q4
R30 100K
R62 100K
CS60
C5 .47μF
R7 51K
R6 120K
C4 .47μF
C111 470pF
C112 470pF
U2

VIDEO DISPLAY DEVICE EMPLOYING TWO SYNC GENERATIONS

This invention relates to a video display, and in particular to the provision of microcomputer control of non-bus controllable display sub-systems.

BACKGROUND OF THE INVENTION

An existing NTSC receiver design is controlled by a microcomputer with communicates with various receiver sub-systems via a data bus. A particular NTSC receiver is modified to display signals conforming to synchronizing standards other than the NTSC standard. Cost and production considerations may dictate that such a multi-standard video display be engineered for minimal changes to the basic NTSC receiver design.

The existing NTSC receiver design may include a multi function integrated circuit which provides most of the sub-sub-systems required in NTSC TV receiver. Such sub-systems include, for example, IF amplification, video demodulation, chrominance demodulation and decoding, audio demodulation, sync separation and pulse and waveform generation etc. The multiple sub-systems of the integrated circuit are controlled by a microcomputer via a data bus. Hence, to facilitate the display signals other than those conforming to the NTSC synchronizing standard the multi-standard circuit design must controllable by the existing data bus and microcomputer system. Furthermore the multi-standard design must be interfaced to the existing IC sub-sub-systems for signal extraction, and must generate compatible output signals for reinsertion into the existing receiver video and synchronizing systems. However, cost and device availability preclude the use of additional bus controllable multi-standard integrated circuits. Thus, an additional requirement of a multi-standard design is the retention of microcomputer controllability without the use of additional data bus controlled devices.

SUMMARY OF THE INVENTION

A video display has microcomputer control via a data bus and comprises a first sync generator coupled to the data bus for control by data thereon. A second sync generator is without controllable coupling to the data bus. An amplifier is coupled to an inductance for generating a current therein. A means for controlling the second sync generator is coupled to the first sync generator and is responsive to a digitally controlled signal therefrom. The second generator output signal is coupled to the amplifier for current generation responsive to the digitally controlled signal.

DETAILED DESCRIPTION

Figure 1:
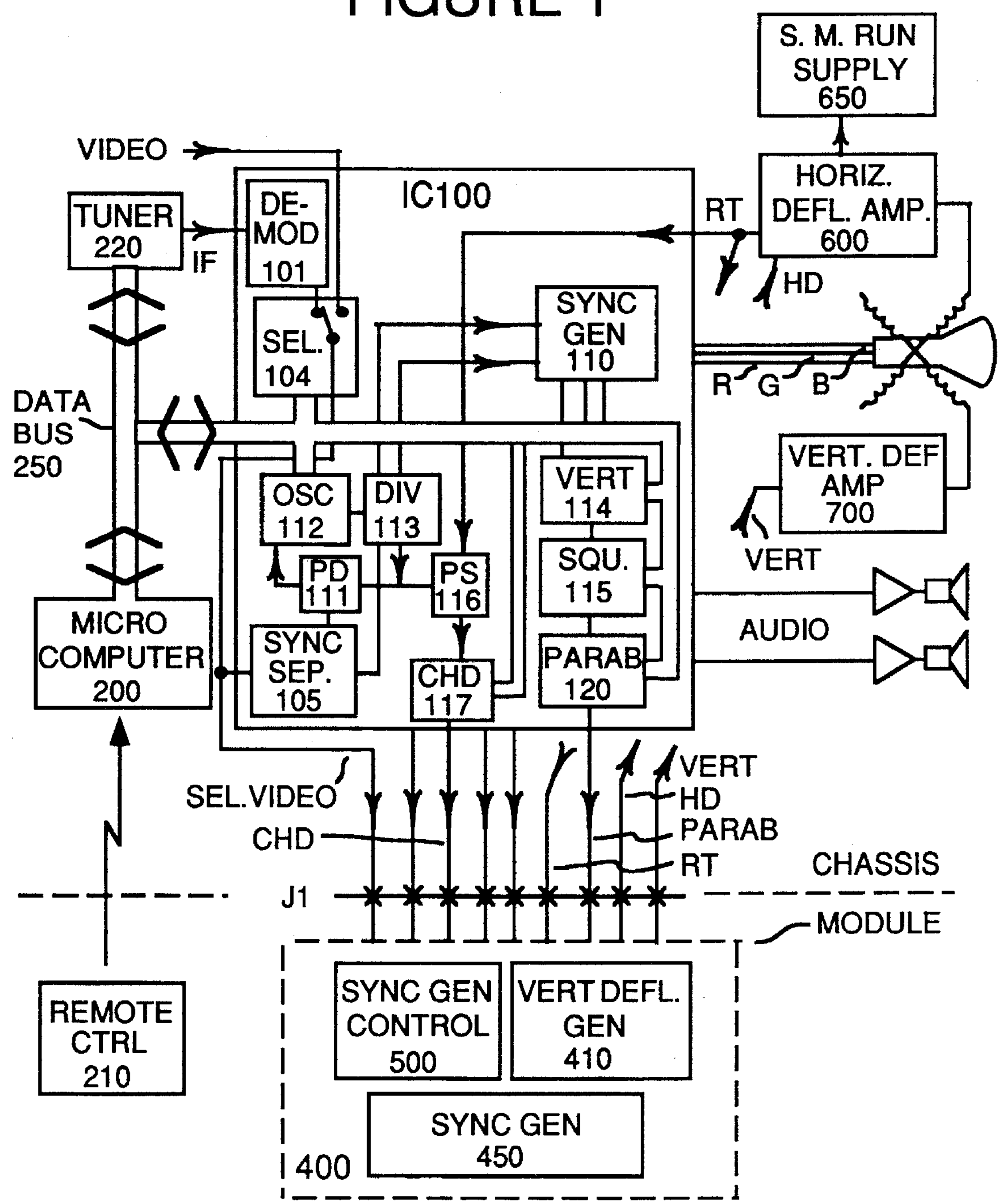
FIG. 1 shows a simplified block diagram of a TV receiver incorporating an inventive control arrangement.

FIG. 1 is a block diagram of a TV receiver employing a microcomputer 200, for control of various sub-systems via a data bus 250. The data bus is connected to an RF tuner 210 and to a multi function NTSC TV receiver integrated circuit IC 100. Integrated circuit 100 provides the following receiver sub-systems, IF amplification, video demodulation 101, video source selection 104, chrominance demodulation and decoding, audio demodulation, sync separation 105 and pulse and waveform generation (110–120) etc. In FIG. 1, IC 100 is depicted with some of the multiple circuit functions provided therein. The data bus 250, is shown illustratively extended within IC 100 to indicate specific circuit functions controlled by data from the microcomputer 200.

Integrated circuit 100 contains a switch 102 which permits selection of video for display. The selection is made by a remote control unit command sent to the microcomputer 200 and then via the data bus 250 to IC 100. Video may originate from outside the receiver, in the form of a base band video input signal or may be received by the RF tuner 220, and input as an IF signal for demodulation by demodulator 101. The selected video source is connected to a sync separator 105 which separates the synchronizing pulses from the selected video signal. The separated sync are coupled to synchronizing generator 110, the separated horizontal sync signal is coupled to a phase detector 111 which controls the frequency of an oscillator 112. The oscillator signal is divided by 32 in a divider 113, to generate a horizontal rate signal which is applied to the phase detector 111. The horizontal rate signal is also applied to a phase shifter 116 together with a retrace signal RT from the horizontal deflection amplifier 600. The phase shifter output determines the horizontal phase of a horizontal drive signal generator 117. Prior to multi-standard modification output signal CHD, from horizontal drive signal generator 117 was connected to a horizontal deflection amplifier 600, and switch mode run power supply 650. Similarly, prior to modification, a vertical deflection signal is generated and coupled to a vertical deflection amplifier 700. Various other correction waveform signals are generated from the locked oscillator 112 and synchronizing generator 110. A vertical frequency sawtooth shaped signal is generated by generator 114 and is coupled to a squaring circuit 115. Circuit 115 performs a mathematical squaring function that converts the vertical rate sawtooth shaped signal into a parabolic waveform. The parabolic signal is then coupled to the parabolic signal amplifier 120 for control.

Multi-standard operation is facilitated by circuitry of module 400 which is coupled to the chassis and IC 100 via a connector J1. Various signals generated by IC 100 are intercepted and coupled to connector J1, similarly multi-standard deflection signals, generated by the circuitry of module 400, are returned to the main chassis via connector J1. Module 400 comprises a sync pulse generator 450, a vertical deflection waveform generator 410, and an inventive sync generator control 500. A detailed description of module 400 will be given with reference to FIGS. 2 and 3.

Microcomputer 200 receives and transmits data from the bidirectional data bus 250, and in addition control data is received from the remote control receiver 210. Thus virtually all the receiver setup and user operational controls are provided via microcomputer 200 and bidirectional data bus 250. For example, a user may employ remote control 210 to turn the receiver on, in fact the receiver will be switched from a stand-by low power dissipation condition to an operating run condition. The power on command is received by microcomputer 200, processed and transmitted to IC 100 via the data bus 250. The power on instruction starts oscillator 112 within IC 100, which following a short stabilization period is counted down by divider 113, to produce horizontal drive and vertical deflection signals in conjunction with a sync generator 110. As described earlier prior to multi-standard modification, horizontal drive was coupled to the horizontal deflection amplifier 600. The horizontal deflection amplifier 600, may be considered to be biased in a class C condition where, in the absence of a horizontal drive signal, the amplifier is turned off. Thus, the appearance of horizontal drive from IC 100 causes horizontal deflection amplifier 600, to conduct and generate both deflection current and switching current for a switch mode run power supply 650 which may include a conventional horizontal flyback transformer. Thus, the run power supply 650 starts up and produces power for various supplies which activate the complete receiver.

The run power supply may be shut down by the termination of the horizontal drive signal coupled to horizontal deflection amplifier 600. Run power supply shut down may, for example, be responsive to any of three separate conditions, a user determined off command, an X ray protection shut down, or a microcomputer determined power on reset. These commands are communicated from microcomputer 200 via data bus 250 to IC 100 where they are received, decoded and implemented. As described above, horizontal deflection amplifier 600 operates in a class C mode. However, merely terminating horizontal drive signal may result in the destruction of the amplifier. Thus, responsive to a data bus shut down command, originated from any of the three sources, the horizontal drive signal coupled to the horizontal deflection amplifier, assumes a positive potential. The cessation of horizontal drive and positive potential ensure non-destructive turn off of the deflection amplifier and thus termination of run power supply generation, placing the receiver in a stand by condition.

As described earlier, vertical and horizontal drive signals generated by vertical generator 114 and controlled horizontal drive generator CHD 117 of IC 100 are not used in multi-standard receiver operation. Thus the multiple standard sync pulse generator 450, which generates horizontal drive signals appropriate to the various standards, must emulate the controlled horizontal drive signal CHD generated by circuit 117. Hence sync pulse generator 450, must be responsive to microcomputer generated data bus communicated commands. However, cost and device availability may preclude the use of a bus controlled multiple standard sync pulse generator.

Figure 2:
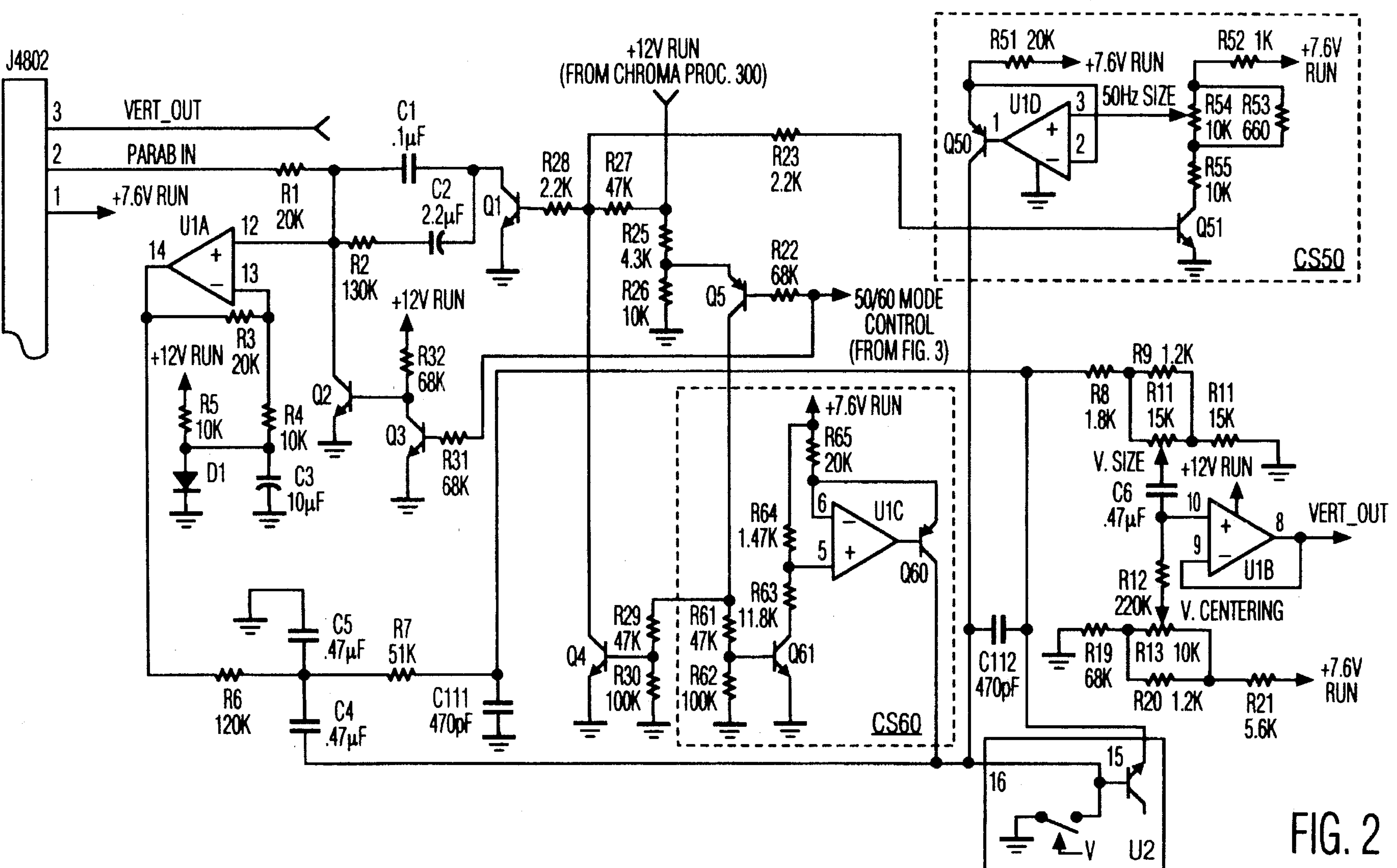
FIG. 2 is an electronic schematic drawing showing vertical deflection waveform generation.

FIG. 2 shows in electronic schematic form, the circuitry of vertical deflection waveform generator 410. A ramp signal is generated by charging capacitors C4 and C5 from a selectable constant current source CS50 or CS60. The appropriate source being selected by a control signal generated by control signal 50/60 mode logic 456 responsive to the vertical frequency detector 455, shown in FIG. 3. The ramp formed across capacitors C4 and C5 is coupled to a buffer amplifier and reset switch 460, within IC U2. The reset switch of 460, is driven with a vertical rate signal, derived from the selected video signal by sync separator 454 of FIG. 3. Thus, the vertical reset switch 460 rapidly discharges capacitors C4 and C5 forming a ramp signal having the same frequency as the separated vertical sync. The ramp signal is coupled from the buffer amplifier to an amplitude control network which determines vertical raster size. The wiper of the size control R11 is AC coupled via a capacitor C6, to a non-inverting input of an amplifier U1B which is configured as a voltage follower. Vertical centering of the raster is facilitated by a DC potential from a potentiometer R12 connected to the non-inverting input of amplifier U1B. The output ramp signal from amplifier U1B is returned to the main chassis via connector J1 for coupling to vertical deflection amplifier 700. The ramp from the buffer amplifier U2 is also fed back via a resistor R7, to generate a linearizing component to correct the differentiating effects of AC coupling capacitor C6. The vertical ramp signal is "S" corrected by an integrated vertical rate parabolic shaped signal which is coupled to the junction of ramp capacitors C4 and C5. The parabolic shaped signal is amplified by amplifier U1A and coupled via an integrator formed by resistor R6 and the combination of capacitors C4 and C5. The vertical rate parabolic signal is generated by squaring circuit 115 and parabola amplifier 120 of IC100, of FIG. 1. The parabola is coupled via connector J1 to a selectively controlled filter and amplitude correction circuit operable in 50 Hz field rates. The filter and amplitude corrector couple the parabolic signal to an input of amplifier U1A.

Figure 3:
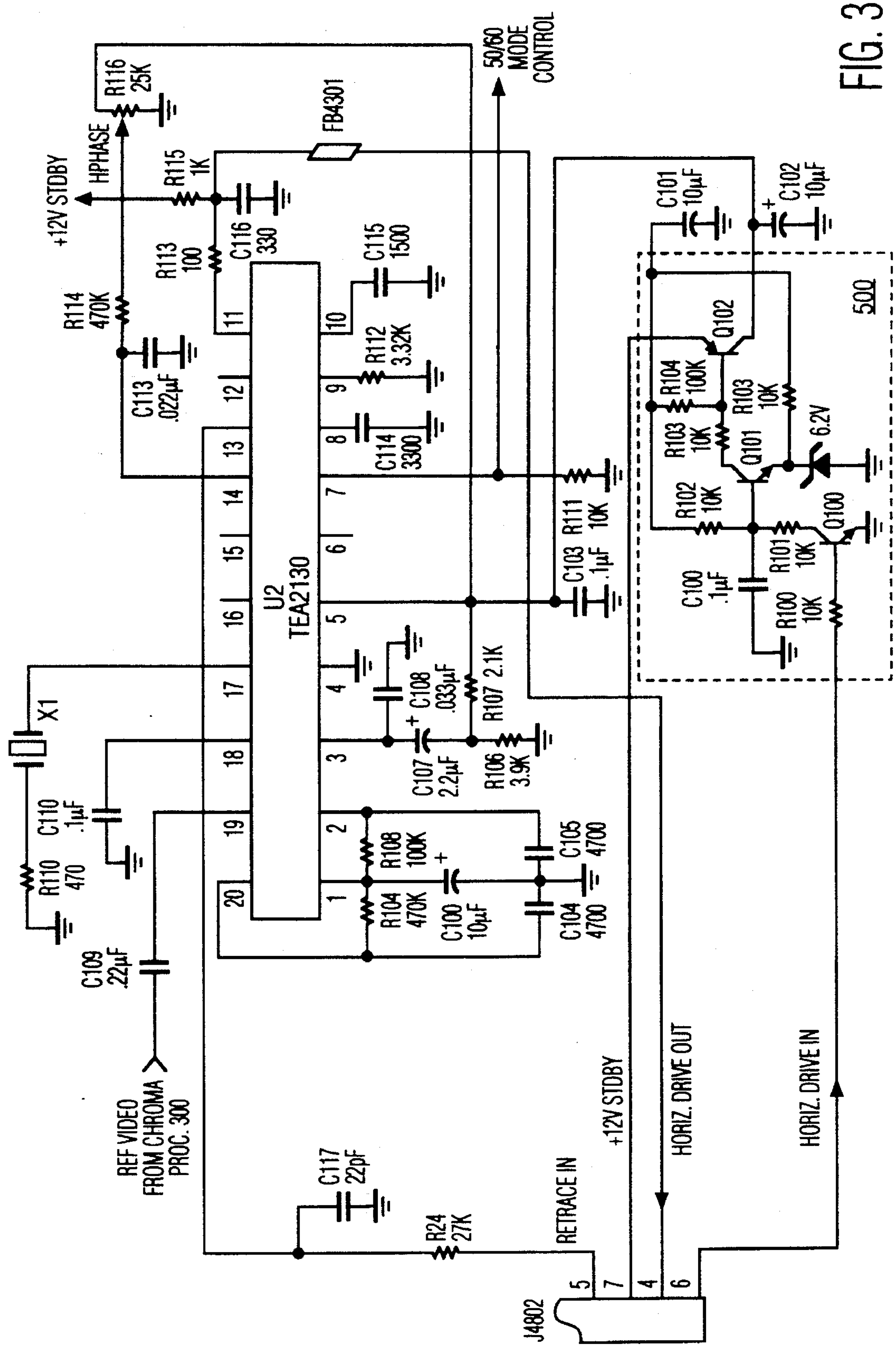
FIG. 3 is an electronics schematic drawing showing an inventive embodiment.

Synchronizing generator 110, of IC 100, is synchronized by a horizontal rate signal from divider 113 which is frequency locked to separated horizontal sync from separator 105. Separator 105 is fed selected video from switch 102 of IC 100. However, sync generator 110 and divider 113 function by the count down method, based on divisors determined by the NTSC standard, thus to provide operation in multiple synchronizing standards requires the use of a second synchronizable multi-standard sync generator. A synchronizable multi-standard sync generator U2, is shown in FIG. 3, for example IC type TEA 2130. Selected video from switch 102, of IC 100, is coupled via connector J1 to a capacitor C109 which is connected to pin 19 of sync generator IC U2. The video signal is coupled to sync separator 454, of IC U2, for sync separation. The horizontal sync separator employs a slicing method where sync pulses are detected at a 50% sync amplitude value determined by a capacitor C110, connected between pin 18 and ground. The separated horizontal rate pulses are used in a first control loop 453, to synchronize the frequency of a voltage controlled oscillator 451 within IC U2. A ceramic resonator X1 with a resonant frequency of 32 times the horizontal frequency, approximately 500 KHz, is employed as a reference for oscillator 451. The oscillator signal and is counted down by divider 452, to produce synchronizing signals appropriate to various synchronizing standards. The first control loop 453, has a low pass filter comprising a capacitor C108 coupled from IC U2 pin 3 to ground and a second capacitor C107 connected from pin 3 to a positive DC potential developed at the junction of a resistive divider formed by resistors R106 and R107. Horizontal retrace pulses RT, from horizontal deflection amplifier 600, are coupled via connector J1 to a high frequency roll off filter formed by a series resistor R24 and a shunt connected capacitor C117. The filtered retrace pulses are applied to pin 13 of IC U2 to provide a horizontal phase reference for a second phase locked loop 485. The second PLL 485, is coupled to a monostable multivibrator 459, which generates a horizontal drive signal HD, at pin 11 of U2. A 1.3 volt internally generated reference is coupled to the monostable multivibrator 459, which in addition has a timing capacitor connected between pin 10 and ground. The 1.3 volt reference is also coupled to ground via a resistor R112 connected to pin 9. The horizontal drive signal HD, is phase locked to the retrace pulse RT and may be adjusted in horizontal phase by a potentiometer R116. The wiper of potentiometer R116 is coupled via a low pass filter formed by a series resistor R114 and a shunt connected capacitor C113 and applied to pin 14 of U2. Potentiometer R116 develops a positive DC potential which is added to the PLL output signal for coupling to multivibrator 459. Multivibrator 459 generates horizontal drive signal HD, which is coupled via a series connected resistor R113 to the junction of a resistor R115 and a high frequency roll off capacitor C116. The junction of capacitor C116 and resistor R115 is connected via connector J1 to deflection amplifier 600 on the main chassis. At cessation of horizontal drive generation, the HD output signal assumes a positive potential due to the pull-up action of resistor R115 which is coupled to the 12 volt stand by power supply.

The voltage controlled oscillator signal is counted down further by counter 452, to generate timing or gating windows which occur between specific counts, or field line numbers. These gating windows provide enhanced noise immunity for separation of vertical sync pulses from the selected video signal. The separated vertical sync pulses are processed by vertical reset pulse generator 460 to generate a reset pulse which discharges the vertical rate ramp forming capacitors C4 and C5. The reset switch part of generator 460 is depicted in a section of U2 shown in FIG. 2. The timing windows generated by counter 452 are also employed to for automatic vertical frequency determination. For example, a timing window is generated between line counts of 247–277 and coupled to a gate together with separated vertical sync pulses. Vertical sync pulses occurring within the line counted window are thus assumed to be from a field of approximately 262 lines duration which thus has a 60 Hz rate. The repetitively occurrence of vertical sync pulses between line counts of 247–277 is indicated to be a 60 Hz field rate signal which sets 50/60 mode control logic 456 to generate an output signal having nominal value of 6 volts. Similarly a vertical sync pulse occurring between line counts of 277–361 is assumed to be from an approximately 312 line field which indicates a 50 Hz field rate and sets the 50/60 mode control logic output control signal, to a nominal value of 11 volts. When the selected video signal is absent, for example during tuning, breaks in transmission etc., the vertical frequency gating logic sets the 50/60 mode control logic output to nominally zero volts thus grounding the vertical rate parabola signal at U1A in FIG. 2.

Although the vertical frequency gating logic can indicate either 50 Hz or 60 Hz vertical frequencies, operation of the sync generator U2 is not limited to these two rates. For example, sync generator U2 may be synchronized, both horizontally and vertically, with a video signal comprising 655 lines, with a field frequency of 48 Hz.

Integrated circuit sync generator U2 also includes circuitry for sync pulse noise level detection for the detection of VCR replayed video signals to enable automatic selection of time constants for the first VCO loop. A voltage equal to half the Vcc supply is output at pin 1 and decoupled to ground via a capacitor C100. This voltage is coupled to pin 20, via a resistor R104 and is decoupled to ground at pin 20 by a capacitor C104. The voltage is also coupled to pin 2 via a resistor R108 and is decoupled to ground at pin 2 by a capacitor C105.

Various other circuitry is included within IC U2 which is not specifically utilized in this multi-standard display use.

As described earlier, the switch mode run power supply 650 is controlled responsive to various on/off commands processed and transmitted by the microcomputer 200 via the data bus 250. However, horizontal drive generated by multi-standard sync generator U2, has no provision for data bus control. Thus, the microcomputer on/off commands must be communicated to sync generator U2, and control means provided to enable the multi-standard horizontal drive signal HD to be generally similar to the controllable horizontal drive signal CHD. The two control states of controllable horizontal drive signal CHD must be emulated to provide control of the run power supply responsive microcomputer commands.

The controllable horizontal drive signal CHD, generated by phase shifter 116 and monostable multivibrator 117 is responsive to on/off commands transmitted via the data bus. Signal CHD is coupled via connector J1 to inventive control circuit 500 of FIG. 3 where it is coupled via a resistor R100 to the base of a transistor Q100. The emitter of transistor Q100 is connected to ground and the collector is connected to a resistor R101. Resistor R101 is connected to the junction of a capacitor C100 and a resistor R102 connected in series, with the capacitor connected to ground and the resistor connected to a 12 volt stand by power supply. The base of a transistor Q101 is also connected to the junction of capacitor C100 and a resistor R102. The emitter of transistor Q101 is held at a potential of 6.2 volts by a zener diode D100 which is coupled to the 12 volt stand by supply via a resistor R105. Resistors R103 and R104 are connected in series between the 12 volt stand by supply and the collector of transistor Q101. The junction of resistors R103 and R104 is connected to the base of a PNP transistor Q102 which has the emitter connected to the 12 volt stand by supply and the collector connected to the Vcc supply pin 5 of IC U2. The collector of transistor Q102 is decoupled to ground by capacitors C102 and C103.

Figure 4:
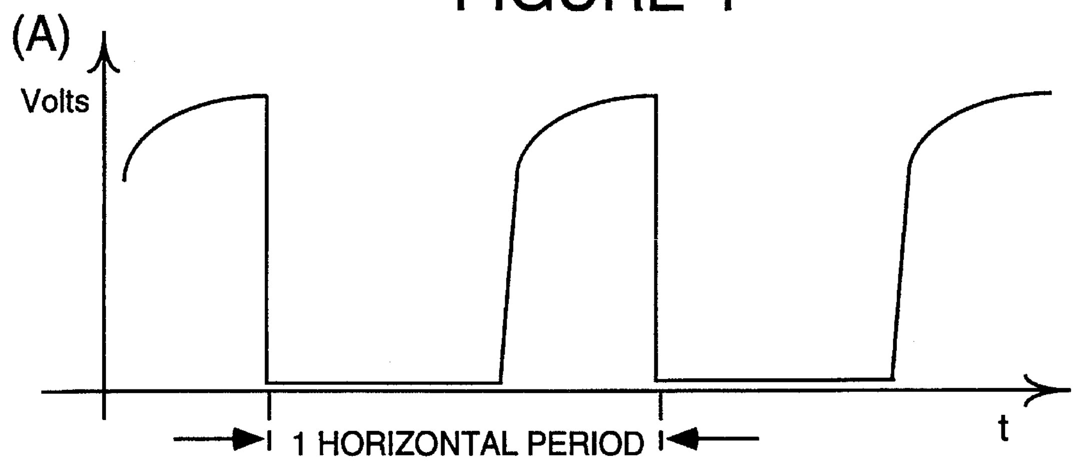
FIG. 4 shows waveforms occurring within the sync generator control circuit of FIG. 1.
Figure 4:
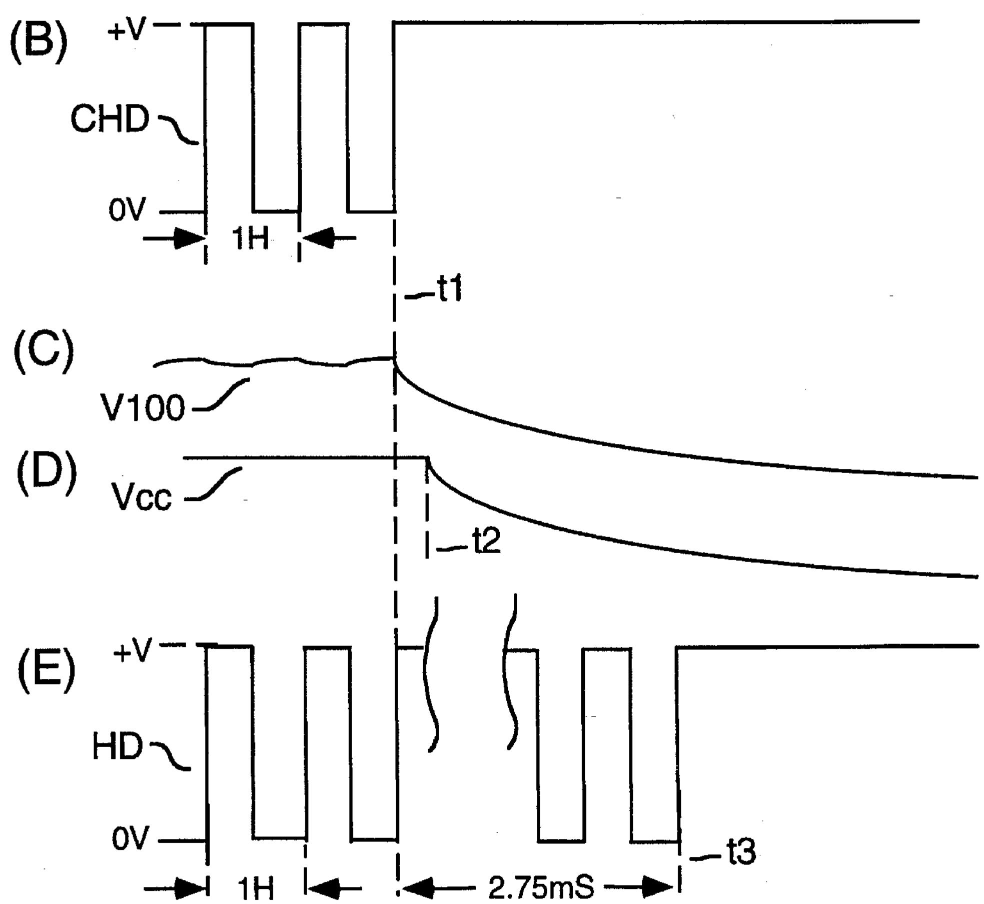

The controllable horizontal drive signal CHD, has a square waveform shape with a non-symmetrical mark space ratio as illustrated in FIG. 4(A). When signal CHD is positive transistor Q100 conducts drawing current from capacitor C100 and the 12 volt standby supply via resistor R102. When signal CHD is low transistor Q100 is turned off allowing capacitor C100 to be charged from the 12 volt supply via resistor R102. Since signal CHD is non-symmetrical, with a longer low level interval, a positive DC potential V100, is established across capacitor C100 and coupled to the base of transistor Q101. The emitter of transistor Q101 is held at 6.2 volts, thus when potential V100 exceeds approximately 6.9 volts, transistor Q101 conducts, drawing current from the 12 volt supply via resistors R104 and R103. The resistors R104 and R103 form a potential divider with junction connected to the base of PNP transistor Q102. Current flow via resistors R103 and R104 generates a potential across resistor R104 which turns on and saturates the series pass transistor Q102 coupling the 12 volt stand by supply to the provide a Vcc supply for multi-standard sync generator U2. Thus the application of the 12 volt Vcc supply to sync generator U2 causes the internal oscillator 451 to start, and generate the various signals described earlier.

In FIG. 4(B) horizontal drive signal CHD, from CHD generator 117 is depicted about time t1. The interval prior to time t1 corresponds to an on or first control condition and the time subsequent to t1 corresponds to a data bus communicated off command. In responsive to the off command, controllable horizontal drive signal CHD assumes a positive potential of approximately 6 volts. This positive DC value is coupled via connector J1 and causes transistor Q100 to conduct discharging potential V100 across capacitor C100 as depicted in FIG. 4(C). At time interval t2, depicted in FIG. 4(D), potential V100 has decayed sufficiently for transistor Q101 to turn off and cease current flow in series connected resistors R104 and R103. Hence when transistor Q101 turns off, series pass transistor Q102 is also turned off which terminates the Vcc supply to sync generator U2.

After termination of the Vcc supply, operation of sync generator U2 is sustained for approximately 2.75 milliseconds by decoupling capacitor C102. At time interval t3 of FIG. 4(E), sync generator U2 ceases operation and the horizontal drive output signal HD assumes a positive potential emulating the second controlled condition of signal CHD. Thus, inventive control circuit 500 controllably couples a signal responsive to data bus commands to the non-data bus controllable multi-standard sync generator U2.

What is claimed is:

1. A video display having microcomputer control via a data bus comprising:

a first sync generator coupled to said data bus for control by data thereon;

an amplifier coupled to an inductance for generating a current therein;

a second sync generator without controllable coupling to said data bus; and means for controlling said second sync generator coupled to said first sync generator and responsive to a digitally controlled signal therefrom, said second generator having an output signal coupled to said amplifier for synchronized current generation in said inductance responsive to said digitally controlled signal.

2. The display of claim 1, wherein said amplifier comprises a deflection amplifier.

3. The display of claim 1, wherein said amplifier comprises a switched mode power supply type.

4. The display of claim 1, wherein said controlling means further comprises a switch controllably coupled to said digitally controlled signal for controlling said second generator.

5. The display of claim 4, wherein said digitally controlled signal has a first condition and a second condition determined by said microcomputer.

6. The display of claim 5, wherein said current is generated and responsive to said first condition.

7. The display of claim 5, wherein said digitally controlled current is terminated responsive to said second condition.

8. The display of claim 5, wherein said first condition said signal comprises a horizontal frequency signal.

9. The display of claim 5, wherein said second condition said digitally controlled signal comprises a DC potential.

10. The display of claim 5, wherein said switch couples a DC power supply to said second generator responsive to said first condition.

11. The display of claim 10, wherein said switch terminates said DC power supply responsive said second condition.

12. The display of claim 2, wherein deflection current flow in said amplifier is terminated responsive to second condition.

13. The display of claim 10, wherein said second generator generates a drive signal responsive to said first condition, said drive signal being substantially similar to said controlled signal in said first signal condition.

14. The display of claim 10, wherein said second generator generates a disabling signal responsive to said second condition, and being substantially similar to said controlled signal in said second condition.

15. A video display having a microcomputer for control via a data bus said display comprising:

a first sync generator being controlled by said data bus, said generator generating a signal indicative of at least two data bus control conditions;

a second sync generator without control by said data bus and generating an output signal;

a switch responsive to said indicative signal, coupled to said second sync generator to control generation of an output signal responsive to said control conditions; and a synchronizable power dissipating load being coupled to said output signal for synchronization and power generation and dissipation responsive to said data bus control conditions.

16. A video display operable in at least two television standards comprising:

a first sync generator controlled via a data bus, and generating a signal indicative of at least two data bus control conditions; and a second sync generator synchronized by a video signal having one of said at least two television standards, and coupled to said first sync generator for control by said indicative signal, said second sync generator generating output synchronizing signals for deflection generation at said one of said at least two television standards.

* * * * *

UNITED STATES PATENT AND TRADEMARK OFFICE

CERTIFICATE OF CORRECTION

PATENT NO. : 5,473,386

DATED : December 5, 1995

INVENTOR(S) : Kenneth J. Helfrich and Joseph C. Stephens

It is certified that error appears in the above-identified patent and that said Letters Patent is hereby corrected as shown below:

IN THE CLAIMS:

Column 7, Line 36, after "said" delete "digitally controlled"
Column 7, Line 39, before "signal" insert --digitally controlled--.

Signed and Sealed this

Twenty-eighth Day of May, 1996

Attest:

BRUCE LEHMAN

*Attesting Officer* *Commissioner of Patents and Trademarks*